United States Patent [19]

Stone et al.

[11] 4,275,556
[45] Jun. 30, 1981

[54] CLEVIS TYPE CONNECTION DEVICE

[75] Inventors: Franz T. Stone, East Aurora; Kenneth D. Schreyer, Clarence, both of N.Y.

[73] Assignee: Columbus McKinnon Corporation, Tonawanda, N.Y.

[21] Appl. No.: 42,508

[22] Filed: May 25, 1979

[51] Int. Cl.³ .............................................. F16G 15/00
[52] U.S. Cl. ...................................... 59/93; 294/82 R
[58] Field of Search .............................. 59/93, 78, 84; 294/82 R

[56] References Cited

U.S. PATENT DOCUMENTS

| 630,001 | 8/1899 | Lyman | 278/65 |
|---|---|---|---|
| 1,393,568 | 10/1921 | Remsberg | 59/93 |
| 1,836,169 | 12/1931 | Humphreys | 59/93 |
| 2,369,344 | 2/1945 | Ehmann | 59/86 |
| 3,863,441 | 2/1975 | Kaufmann | 59/93 |
| 3,958,411 | 5/1976 | Bernt | 59/93 |
| 3,974,641 | 8/1976 | Rieger | 59/93 |
| 4,134,255 | 1/1979 | McBain | 59/86 |
| 4,134,256 | 1/1979 | Fredriksson | 59/93 |
| 4,145,874 | 3/1979 | Muller | 59/93 |
| 4,149,369 | 4/1979 | Smetz | 59/93 |
| 4,171,841 | 10/1979 | Rehbein | 59/93 |
| 4,182,116 | 1/1980 | Clement | 59/93 |

FOREIGN PATENT DOCUMENTS

| 592427 | 2/1960 | Canada . | |
| 2433345 | 1/1976 | Fed. Rep. of Germany | 59/93 |
| 220440 | 8/1924 | United Kingdom . | |
| 1192081 | 5/1970 | United Kingdom | 59/86 |
| 1407149 | 9/1975 | United Kingdom | 59/86 |

Primary Examiner—Nicholas P. Godici
Assistant Examiner—Gene P. Crosby
Attorney, Agent, or Firm—Bean, Kauffman & Bean

[57] ABSTRACT

A clevis type connection device has one leg thereof formed with a "blind" bore opening and another leg thereof formed with a through-bore opening, which is arranged in axial alignment with the "blind" bore opening; the bore openings thereof being sized to rotatably support opposite ends of a load engaging pin. The load pin is either removably retained or permanently installed within the bore openings.

13 Claims, 6 Drawing Figures

CLEVIS TYPE CONNECTION DEVICE

BACKGROUND OF THE INVENTION

Various devices have been designed to provide a simple and convenient arrangement for attaching hooks and/or the like to load lift chains or cables by means of clevis arrangements as shown for example in U.S. Pat. Nos. 630,001; 1,198,139; 1,393,568; 1,562,908; 1,836,169; 3,243,952; 3,863,441; British Pat. No. 220,440 and Canadian Pat. No. 592,427. Applicants are also aware of a design for such purpose which is disclosed in commonly assigned and presently pending U.S. application Ser. No. 619,596.

SUMMARY OF THE INVENTION

The present invention is directed towards an improved clevis load pin retention system, protecting the pin from external buffeting and minimizing the likelihood of unintentional removal of the load pin from operative engagement with the load chain (or cable). The device also provides improved barriers against entry of moisture/dirt etc. into the load pin carrying sockets and relatively moving parts of the device.

DRAWINGS

DETAILED DESCRIPTION

Figure 1:
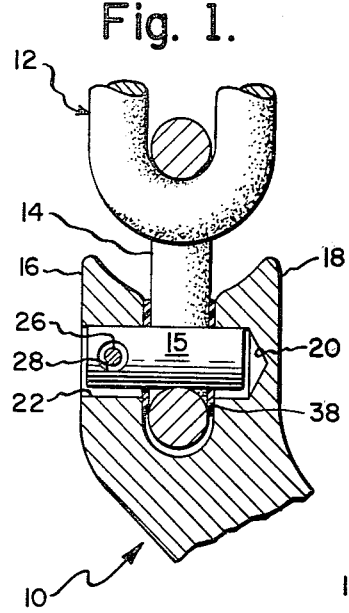
FIG. 1 is a part-sectional and elevational view; showing fragmentarily by way of example how the device of the invention may be employed in association with one presently preferred mode of employment of the invention.

As illustrated, the invention is shown by way of example as being embodied in a chain-carried load engaging hook 10; the load chain being indicated generally at 12 which terminates in a link 14 which engages the hook-carried load pin 15. The load pin is cradled in freely rotatable and side-wise slip-fittable relation at its opposite ends in the parallel leg portions 16-18 of the hook body 10; thereby providing a so-called clevis type arrangement for interconnecting the load chain and the hook. Whereas the drawings show a variety of load pin retention arrangements in either case the load pin is arranged to be rotatable and axially slidable within the bearing sockets 20, 22 which are drilled in mutual alignment into the clevis legs 16-18.

As shown in FIGS. 1, 2, 3, 5, a "blind" bore hole as illustrated at 20 is drilled only part way into one of the clevis legs such as is shown herein at 18; whereas the opposite clevis leg 16 is formed with a through-bore 22. In each case the bores 20-22 are preferably overlarge-diametered so as to loosely accommodate in freely bearing and side-wise slidable relation therein the load pin 15. Whereas the blind-bored leg portion 18 of the clevis arrangement provides means for retaining the load pin 15 against unintended disassembly thereof by displacements to the right as viewed in the drawings, other suitable means are employed to temporarily block the pin 15 against unintended displacements toward the left.

Figure 3:
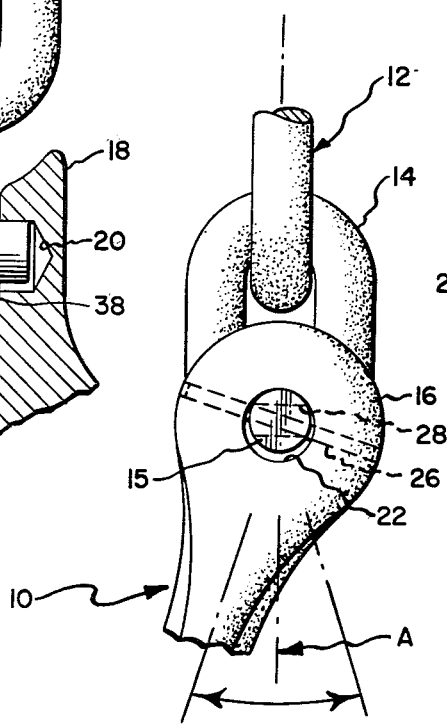
FIG. 3 is a view corresponding to FIG. 2 showing how the load carrying hook thereof may freely deflect away from axial alignments with the load chain without interference.
Figure 2:
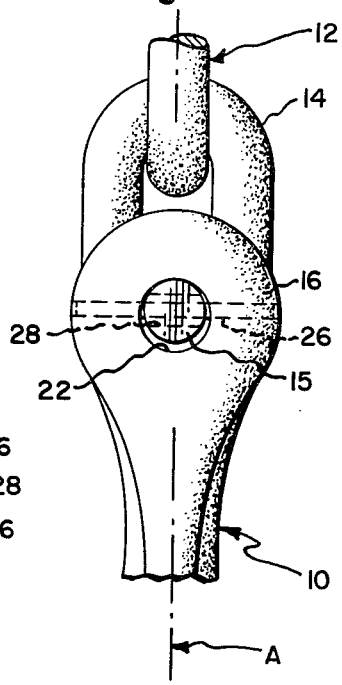
FIG. 2 is a side elevational view of the device of FIG. 1.

For example, FIGS. 1, 2, 3 illustrate how a hard steel lock pin 26 may be employed to bar against unintended sidewise displacements to the left of the load pin relative to the legs of the clevis device. The pin 26 extends through opposite sides of the clevis leg 16 and thence through a relatively large diametered hole 28 which is bored transversely through the pin 15. Thus, it will be understood that whereas the lock pin 26 will prevent undue displacements of the load pin 15 toward the left as shown herein, it permits the pin 15 to oscillate freely about the load suspension axis of the system, such as is indicated at (A) in FIGS. 2, 3.

It is typical that under continued-tensioned service conditions a chain link (such as the link 14 as illustrated herein) tends to elongate; and in such case at its lower loop end it tends to squeeze and clamp upon the load pin 15. This means that the load pin 15 invariably tends to bind relative to the link 14 and rotationally "ride" with the link as it oscillates relative to the hook 10 under typical usage conditions. As illustrated at FIG. 3, the oversize bore 28 through the load pin 15 freely accommodates such relative swiveling of the parts without damage to the transverse lock pin 26. The lock pin 26 may be either of the solid or roll pin type, as preferred.

Figure 4:
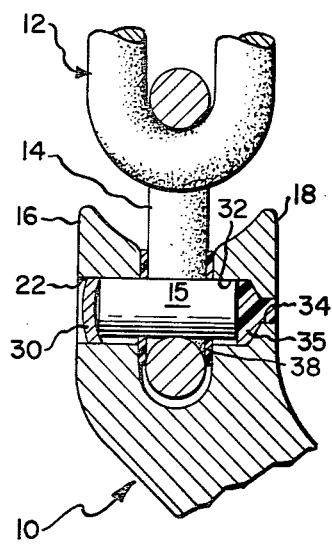
FIG. 4 is a view similar to FIG. 1 but shows an alternative form of pin retention and dirt-seal arrangement.

FIG. 4 shows employment of an expansion plug 30 for blocking against unintended left-wise displacements of the load pin 15; the plug 30 being of the resilient metallic disc type. FIG. 4 also illustrates another form of "blind" bore hole arrangement in the clevis leg 18. In this case the leg 18 is initially counter-bored to include a main bore 32 and a smaller diameter hole 34 extending to its exterior; and prior to insertion of the load pin 15 a sealing plug 35 is press-fitted in place, as shown. The plug 35 is preferably formed of any suitable resilient material, and is shaped to complement the bore 32-34, thereby sealing off unwanted inlet of dirt etc. into the unit. However, note that the load pin 15 may, if desired, be removed from the clevis connection by simply driving a punch type tool into the bore hole 34 against the plug 35 in such manner as to drive the pin against the plug 30 and out of the clevis device. A second expansion type metal plug as shown at 30 may be employed in place of the plug 35.

Figure 5:
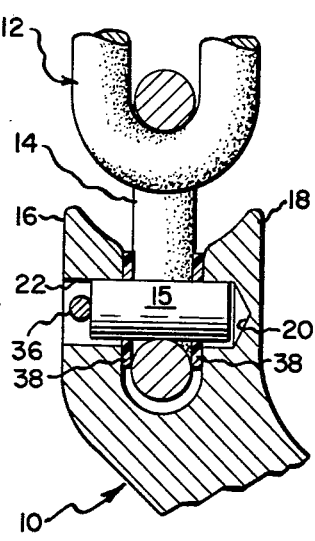
FIGS. 5-6 are views similar to FIGS. 1 and 4, but show use of still other forms of load pin retention and dirt-seal arrangements.

FIG. 5 shows use of a lock pin 36 which is inserted in press-fitting relation within aligned bores through the opposite sides of the clevis leg 16, so as to thereby extend in transverse abutting relation against the end of the load pin 15 for preventing unintended displacements thereof from its operative position as illustrated. FIG. 5 also shows use of dirt-sealing resilient washers 38—38 which are carried in press-fitted relation on the load pin 15. Such washers may be employed in conjunction with the clevis arrangements of FIGS. 1, 4, 6.

Figure 6:
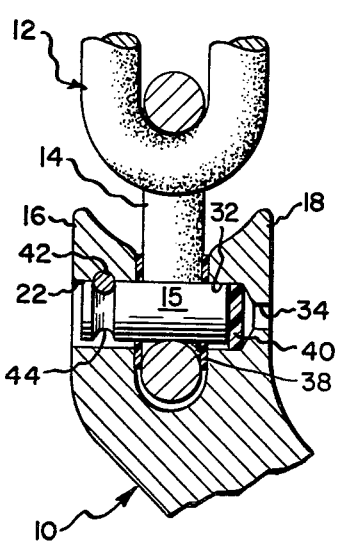

FIG. 6 also illustrates use of a counter-bored opening through the clevis leg 18, which is of the type shown in FIG. 4 and inside of which a resilient sealing disc 40 is press-fitted. At its other end FIG. 6 shows still another arrangement wherein the clevis leg 16 is bored so that a lock pin 42 may be press-fitted therein to protrude and tangentially transverse an annular groove 44 formed peripherally in the load pin 15. Thus, it will be appreciated that whereas the disc 40 operationally "blinds" the bore hole of the clevis leg 18, the load pin 15 may if desired be removed by first driving the lock pin 42 out of engagement therewith and then by inserting a punch type tool into the small opening in the clevis leg 18 and then driving the punch against the seal 40 and pin 15 components until they are disengaged relative to the chain link 14. The lock pins 26, 36, 42 as shown herein are preferably of either the "roll pin" or solid pin types; in either case being preferably self-locking in place but easily removed if desired by driving them out with a punch type tool.

Thus, it will be appreciated that the invention provides a clevis connection arrangement which is particularly applicable to either temporarily or permanently interconnecting chains and the like with load carrying devices such as hooks or the like. The invention features reduced expense of manufacture; versatility in usage; improved protection of relatively moving parts against undesirable binding such as due to entrance of dirt/moisture etc. from externally of the system; and protection against battering of critical parts of the system in usage and unintended dislodgements of the load pin from the clevis unit. Because of the preferred smaller diameter of the load pin relative to the clevis bores, upon removal of the lock pin the load pin may readily be shaken out sidewise of the clevis device, even though the pin may have previously acquired accretions of rust/scale dirt or the like.

We claim:

1. A clevis type connection device for load chains of the loop link type or the like, which comprises:
   a clevis body including a pair of spaced apart legs for receiving a chain link or the like therebetween;
   one of said legs having a first bored hole portion fully closed by sealing means obstructing passage of foreign matter therethrough;
   the other of said legs having a second through-bored hole portion thereof in axial alignment with said first bored hole portion;
   a load pin accommodated in cradled relation within said bored hole portions for extending through the central opening of a chain link or the like,
   said load pin being operational in endwise abutting engagement at one of its ends against said sealing means and of such length that it is disposed at each end within the outer end profiles of said clevis legs when said load pin is disposed to proximate abutting engagement with said sealing means; and
   retaining means intercepting the bore of the other of said legs and adapted to engage said load pin, whereby to constrain said load pin against unintended displacements thereof away from engagement with the central opening of said chain link or the like.

2. A clevis connection device according to claim 1 wherein the other of said legs is formed with a third bore hole extending transversely therethrough, and wherein said retaining means is a member fitted into said third bore hole so as to prevent unintended displacement of said load pin out of cradled relation within said clevis legs.

3. A clevis connection device according to claim 2, wherein said load pin has a transverse passage through which said member is loosely fitted to permit relative swiveling movement between said load pin and said member.

4. A clevis connection device according to claim 3, wherein said sealing means comprises a blind bore integral with said one leg.

5. A clevis connection device according to claim 1 wherein said load pin is so dimensioned with respect to the diameters of said bored hole portions and the spacing between said sealing means and said retaining means so as to loosely fit within said bored hole portions to thereby permit relative free movement thereof.

6. A clevis connection device according to claim 1 wherein said sealing means comprises a blind bore integral with said one leg.

7. A clevis type connection device according to claim 1, wherein dirt sealing resilient washers are press fitted on said load pin at opposite sides of a chain link or the like in abutting engagement with the inner profiles of each of said legs of said clevis body.

8. A clevis type connection device according to claim 1, wherein said load pin is so constructed and arranged with respect to said bored hole portions so as to permit free rotary and free axial movement between said load pin and said bored hole portions at least upon intended removal of said load pin therefrom.

9. A clevis type connection device according to claim 1, wherein at least one of said sealing means and said retaining means comprises a plug fitted into at least one of said bored hole portions, thereby blocking unintended exitings of said load pin from said bored hole portions.

10. A clevis connection device according to claim 9 wherein said plug is of the in-press-fitted type.

11. A clevis connection device according to claim 9 wherein said plug is of the expansion plug type.

12. A clevis type connection device according to claim 9, wherein said plug is of a resilient material.

13. A clevis type connection device according to claim 9, wherein dirt sealing resilient washers are press fitted on said load pin at opposite sides of a chain link or the like in abutting engagement with the inner profiles of each of said legs of said clevis body.

* * * * *